US005187821A

United States Patent [19]

Nieminen et al.

[11] Patent Number: 5,187,821

[45] Date of Patent: Feb. 23, 1993

[54] HOSPITAL BED

[75] Inventors: Matti O. Nieminen, Oulu; Kari Olkkonen, Kauttua, both of Finland

[73] Assignee: A. Ahlstrom Corporation, Noormarkku, Finland

[21] Appl. No.: 848,997

[22] PCT Filed: Oct. 18, 1990

[86] PCT No.: PCT/FI90/00244

§ 371 Date: May 18, 1992

§ 102(e) Date: May 18, 1992

[87] PCT Pub. No.: WO91/05532

PCT Pub. Date: May 2, 1991

[30] Foreign Application Priority Data

Oct. 19, 1989 [FI] Finland ........ 894970

[51] Int. Cl.[5] ........ A61C 7/10

[52] U.S. Cl. ........ 5/83.1; 5/86.1; 5/87.1

[58] Field of Search ........ 5/81.1, 83.1, 88.1

[56] References Cited

U.S. PATENT DOCUMENTS

| | | | |
|---|---|---|---|
| 953,962 | 4/1910 | Lane | 5/87.1 |
| 1,077,359 | 11/1913 | Miller | 5/86.1 |
| 2,683,882 | 7/1954 | Smith | 5/86.1 |
| 3,030,638 | 4/1962 | Verduin et al. | 5/83.1 |
| 3,049,726 | 8/1962 | Getz | 5/86.1 |
| 3,392,410 | 7/1968 | Grahn | 5/83.1 |
| 3,877,089 | 4/1975 | Spivey et al. | 5/81.1 |
| 4,384,378 | 5/1983 | Getz et al. | 5/86.1 |
| 5,005,233 | 4/1991 | Toivio et al. | 5/87.1 X |

*Primary Examiner*—Michael F. Trettel

*Attorney, Agent, or Firm*—Cohen, Pontani, Lieberman, Pavane

[57] ABSTRACT

In a hospital bed comprising a body (4) provided with wheels, a transfer underlay frame (24) for a patient, a lying or resting frame (17), which can be lifted and lowered down, lifting means (30) for the lying frame, and bearer means (15, 20) for a transfer underlay frame; the bearer means comprise two U-shaped bearer rods (15) disposed side by side and turnable in the body, the upper and the lower arms (15*b*, 15*c*) of which are interconnected through articulated joints (18, 22) by a transverse support (16, 21) so as to secure a parallel turn of the arms aside. A bearer beam (20) is secured to the upper transverse support (21) and wheels (19) to the lower support (16). The invention allows a sideways transfer of a patient on a transfer underlay supported by straps (26, 28) secured to a bearer beam, without changing the direction. Wheels (19) provided in the bearer rods (15) move simultaneously to the same direction which ensures that the bed (2) is properly supported during all stages of the transfer.

8 Claims, 2 Drawing Sheets

HOSPITAL BED

FIELD OF INVENTION

The present invention relates to a hospital bed.

PRIOR ART

Swedish published patent application no. 406037 discloses an apparatus for lifting a patient confined to bed in which a pulley and a yoke extending over the bed in transverse direction are provided to serve as transfer means and are secured to a supporting frame extending above the bed. An underlay for transferring the patient is connected to bars beside the bed and the patient which bars again are connected to the yoke. By means of the pulley and the yoke, the patient can be lifted and transferred lying on the transfer underlay.

Swedish patent specification no. 341787 discloses a device for lifting a patient in which device a vertical bar serving as the support frame is connected to an edge of a bed. A transverse bar extending above the bed is connected to the support frame. The structure of the transfer underlay is rigid and it is placed under the patient in the bed. Means for transferring a patient comprise a lifting device connected close to the end of the transverse bar. The lifting device includes an electric motor and a drum provided with a lifting rope. The transfer means further comprise a curved frame which is to be placed across over the patient and to which the rigid transfer underlay is connected. The top end of the frame is connected to the lifting rope.

A problem with these devices is for example that the transfer means are located above the bed and the patient in connection with the support frame. This increases the stress on the support frame, requires space above the bed and generally encumbers the use of the device.

To overcome these and other drawbacks of this kind of apparatus, a device disclosed in Finnish patent application no. 892374 has been developed which comprises an elongated support frame connected to the bed, a transfer underlay for the patient and transfer means for transferring a patient on the transfer underlay supported by the support frame. According to the prior application, the transfer means comprise lifting means disposed between the support frame and the lying plane of the bed in such a way that the support frame and the lying plane of the bed are transferable relative to each other substantially in the vertical direction.

In one embodiment of the prior art apparatus, the support frame is connected directly to the body of the bed in which bed the lying plane can be transferred in vertical direction relative to the body and as the lifting means serves the lifting means of the lying plane.

The support frame can be turned from the initial position to deviate from the direction of the longitudinal axis of the bed to a desired angle beside the bed in order to transfer a patient to a transport underlay.

Another application of the prior apparatus further comprises an additional support for supporting the support frame during the turning movement. The additional support is employed to prevent the apparatus and the bed from falling when the support frame is turned from above the bed to a position deviating from the longitudinal axis of the bed.

DISCLOSURE OF INVENTION

The object of the invention is to provide a hospital bed which dispences with any additional supporting structures during transfer of a patient and which still is stable.

Another object of the invention is to provide a structurally simple hospital bed.

The hospital bed of the invention is characterized in that bearer means comprise two bearer rods pivotable about their vertical axes and disposed side by side at a distance from each other in an end of the body, the bearer rods having upper arms and lower arms, which upper arms in their initial position substantially parallel with the longitudinal axis of the bed extend to a distance over lying underlay part and the lower arms to a distance under the body; in that the upper arms and the lower arms are interconnected through articulated joints by a transverse support so as to ensure a parallel turn of the arms aside; in that a bearer beam for a transfer underlay part is secured to the upper transverse support; and that the lower support is provided with wheels.

The invention provides the advantage that when a patient is being transferred on the transfer underlay from the bed to a transport underlay beside the bed the transfer underlay moves in alignment. Less space is thus required beside the bed than with means in which the transfer underlay turns aside.

BRIEF DESCRIPTION OF DRAWINGS

The invention is described in detail, by way of example, with reference to the accompanying drawings, in which.

DETAILED DESCRIPTION OF THE PREFERRED EMBODIMENTS

Figure 1:
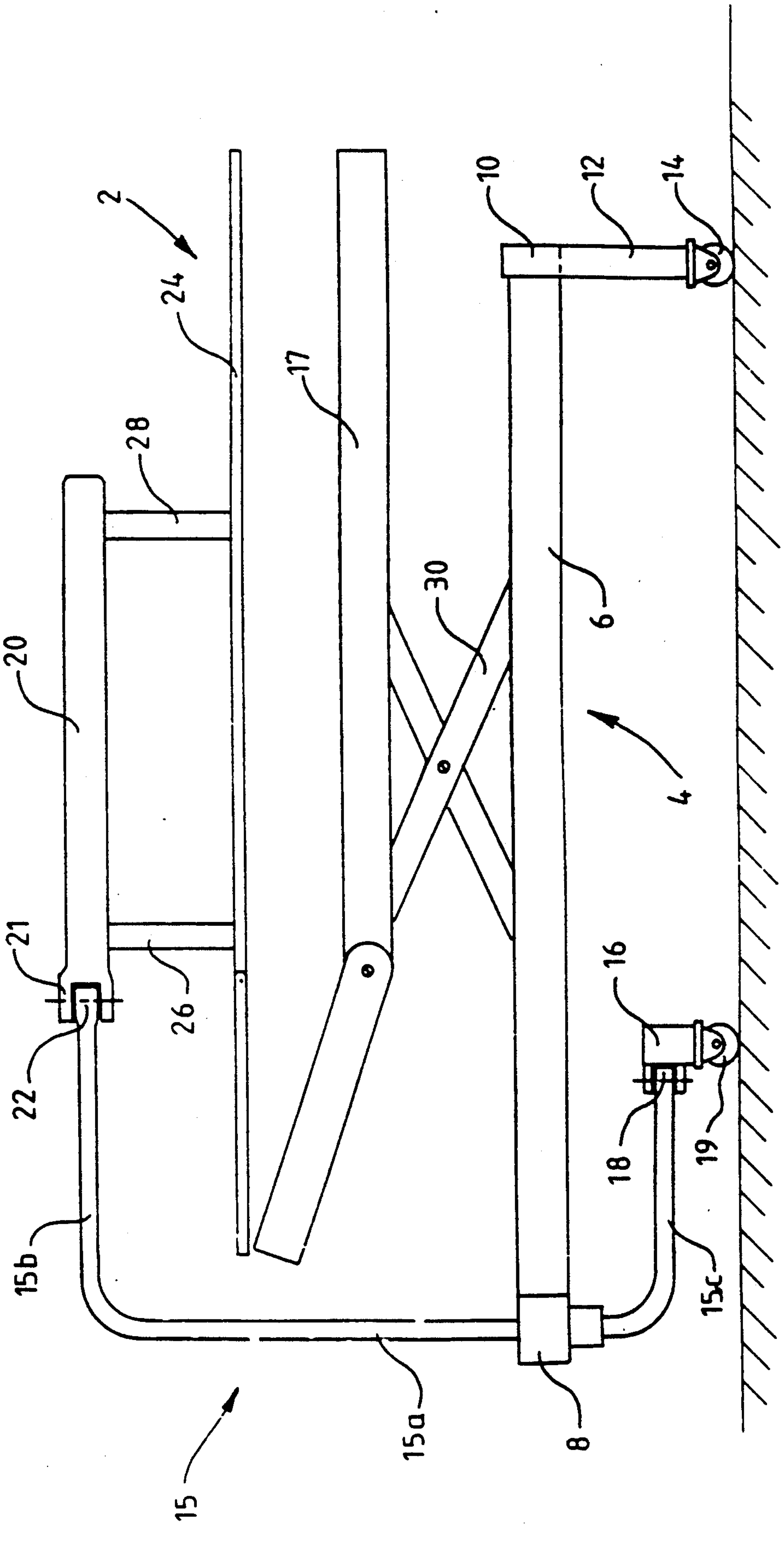
FIG. 1 is a side view of a hospital bed according to the invention.
Figure 2:
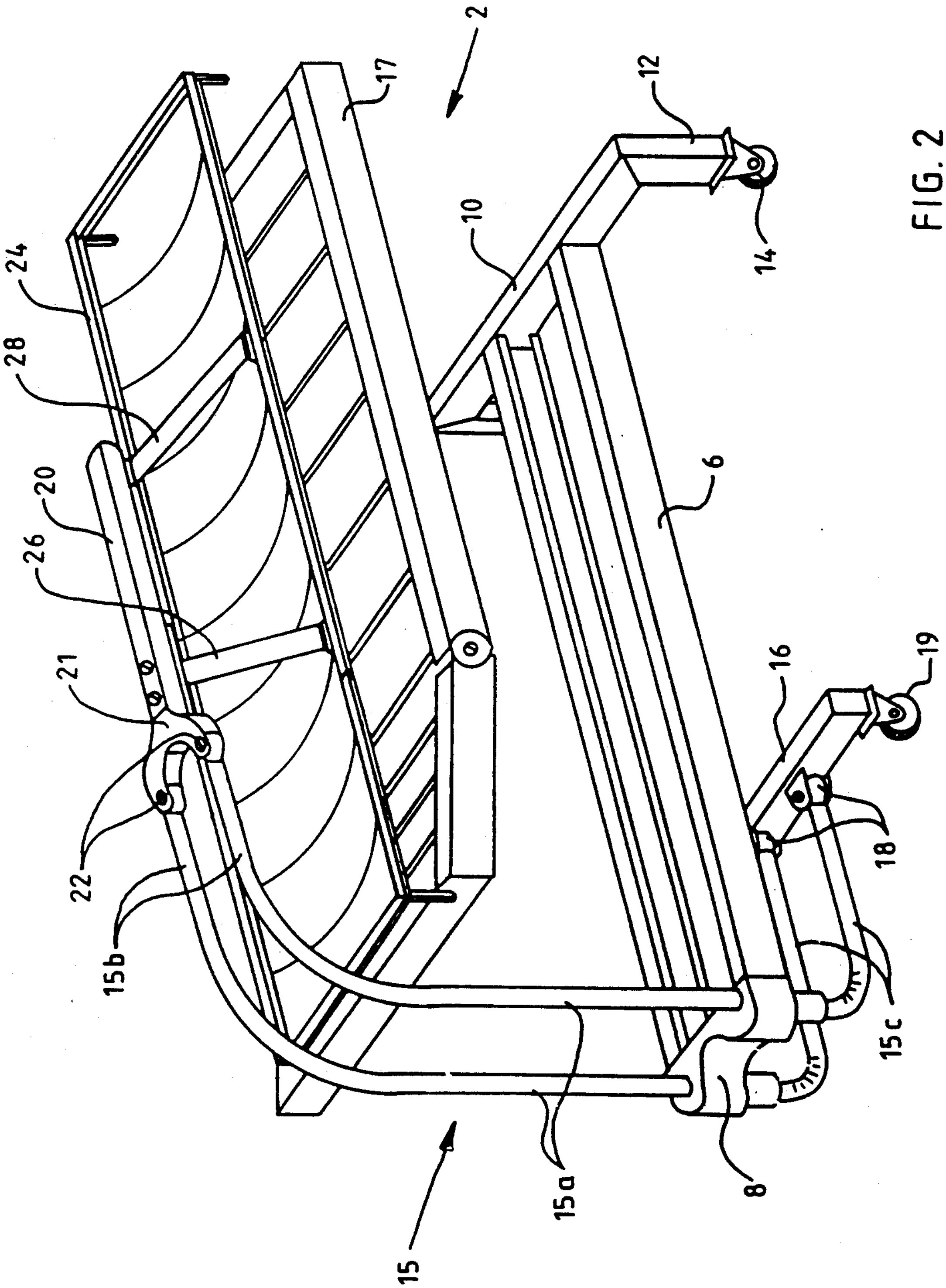
FIG. 2 is a perspective illustration of the bed of FIG. 1 without the lifting means.

The hospital bed 2 illustrated in the figures comprises a body 4 which body comprises two longitudinal bars 6 and end bars 8 and 10. The end bar 10 at the foot end of the bed is provided with legs 12 and wheels 14. Vertical portions 15*a* of two bearer rods 15 are disposed turnably at a distance from each other in the bar 8 at the head end of the bed. The bearer rods are formed by tubes bent to form a U and the upper arms 15*b* of which in their initial position, i.e. substantially parallel with the longitudinal axis of the bed, extend to a position over a lying or rest underlay frame 17 of the bed on which the occupant normally lies. The lower arms 15*c* in their initial position extend for a distance under the body 6. The ends of the lower arms are connected to each other by a transverse bar 16 via articulated joints 18. Wheels 19 are provided at the ends of the transverse bar. The ends of the upper arms 15*b* are connected to each other by a fork portion 21 of a bearer beam 20 via articulated joints 22.

The bed further comprises a transfer underlay frame 24 displacing a patient to and from the rest frame 17 and which in the position illustrated in the figures is supported by straps 26 and 28 secured to the bearer beam 20 but which in it s initial position is supported by the lying underlay frame 17.

The bearer rods 15 are pivotable about their vertical axes in parallel direction due to the fact that they have been connected to each other in the way described above whereby also the bearer beam 20 retains the direction of the bed when it is moved sideways.

When a patient is transferred from the bed onto a transport underlay or wheeled trolley or stretcher (not shown) beside the bed the straps 26 and 28 are secured to the transfer underlay frame 24 disposed under the patient on the lying underlay frame 17. The lying underlay frame is lowered down to its bottom position by a lifting device 30 provided between the lying underlay frame and the body 6 whereby the transfer underlay frame 24 and the patient on it are supported by the bearer beam 20. Subsequent to this, the bearer rods 15 are turned aside so as to position the whole transfer underlay frame 24 beside the lying underlay frame 17 and the transport underlay is lifted to a height where the patient and the transfer underlay frame 17 are supported by the transport underlay trolley (not shown) after which the straps are detached. The transfer of the patient is safe since while the transfer underlay frame 17 is moved sideways, the wheels 19 at the head end of the bed also move to the same direction. This prevents the bed from toppling over.

The distance of the wheels from the pivot axes of the bearer rods is chosen to give adequate support to the transfer device and the body in all stages of the transfer movement. A proper distance is $\frac{1}{8}$–$\frac{1}{3}$ 1 where 1 is the length of the body. When the patient is brought back to the bed the lying underlay frame 17 is lifted to a higher position to receive the patient carried by the transfer underlay frame 17.

The invention has been described above with reference to a preferred application example but it is clear that the invention can be modified in many ways within the scope of protection defined by the appended patent claims.

We claim:

1. An apparatus for transferring a patient supported on a transfer underlay comprising:

- a pair of horizontally spaced parallel bearer rods having vertically extending middle portions defining spaced vertical axes, horizontal upper arm portions and horizontal lower arm portions, said bearer rods being movable between a first position and a second position, both said upper arm portions and said lower arm portions in said first position, being substantially parallel to the longitudinal axes of the transfer underlay;
- a bearer beam having a transverse support portion pivotally connected to said upper arm portions of said pair of bearer rods for allowing said pair of parallel bearer rods to pivot around said vertical axes of said middle portions of said bearer rods from said first position to a second position, and means for supporting said transfer underlay;
- a lower transverse support connected to said lower arm portions for allowing said bearer rods to pivot around said vertical axes; and
- a body frame extending substantially longitudinally of the axes of the transfer underlay, said body frame including a first end connectable with said parallel bearer rods for allowing said bearer rods to pivot around said vertical axes.

2. The apparatus according to claim 1, further comprising an underlay part mounted on said body frame for supporting said transfer underlay.

3. The apparatus according to claim 2, further comprising means for displacing said underlay part toward and away from said transfer underlay, said means for displacing being mounted between said body frame and said underlay part.

4. The apparatus according to claim 1, wherein said pair of bearer rods are bent tubes.

5. The apparatus according to claim 1, wherein said lower transverse support is provided with wheels.

6. The apparatus according to claim 1, wherein said body frame has an end frame distal to said first end.

7. The apparatus according to claim 6, wherein said end frame is provided with wheels.

8. A hospital bed including a means for transferring a patient supported on a transfer underlay, said means for transferring the patient comprising:

- a pair of parallel bearer rods each having a vertically extending middle portion, an upper arm portion and a lower arm portion, said bearer rods being movable between a first position and a second position, both said upper arm portion and said lower arm portion in said first position being substantially parallel to the longitudinal axes of the transfer underlay;
- a bearer beam including a transverse support portion pivotally connected to said upper arm portions of said pair of bearer rods for allowing said pair of bearer rods to pivot around vertical axes of said middle portions of said bearer rods from said first position to said second position, and means for supporting said transfer underlay;
- a lower transverse support connected to said lower arm portions of said bearer rods for allowing said bearer rods to pivot around said vertical axes;
- a body frame having a longitudinal axis extending substantially parallel to a longitudinal axis of the transfer underlay, said body frame having a first end connected to said bearer rods for allowing said bearer rods to pivot around said vertical axes;
- an underlay part mounted on said body frame for supporting said transfer underlay; and
- means for displacing said underlay part from a first position to a second position toward and away from said transfer underlay mounted between said body frame and said underlay part.

* * * * *